US009043358B2

(12) United States Patent
Cheng et al.

(10) Patent No.: US 9,043,358 B2
(45) Date of Patent: May 26, 2015

(54) ENTERPRISE SEARCH OVER PRIVATE AND PUBLIC DATA

(75) Inventors: Lili Cheng, Bellevue, WA (US); Xuedong David Huang, Bellevue, WA (US); Heung-Yeung Shum, Bellevue, WA (US); Eric J. Horvitz, Kirkland, WA (US); James H. Lewallen, Fall City, WA (US); Todd D. Newman, Mercer Island, WA (US); David S. Taniguchi, Kirkland, WA (US)

(73) Assignee: Microsoft Technology Licensing, LLC, Redmond, WA (US)

(\*) Notice: Subject to any disclaimer, the term of this patent is extended or adjusted under 35 U.S.C. 154(b) by 0 days.

(21) Appl. No.: 13/044,414

(22) Filed: Mar. 9, 2011

(65) Prior Publication Data

US 2012/0233209 A1 Sep. 13, 2012

(51) Int. Cl.
*G06F 17/30* (2006.01)

(52) U.S. Cl.
CPC ................. *G06F 17/30312* (2013.01)

(58) Field of Classification Search
CPC .............. G06F 17/30864; G06F 17/30067; G06F 17/30011; G06F 17/30699; G06F 17/30398; G06F 17/30312; G06F 17/30; G06F 15/16; G06Q 30/02; G06Q 10/06; G06Q 10/0635; G06Q 20/102; G06Q 30/0641; G06Q 40/08; Y10S 707/99932
USPC .......... 707/756, 776, E17.005, 808, 616, 641, 707/711, 706, 722, 723, 770, 737, E17.014, 707/E17.033, 17.005; 705/318, 319, 346, 4; 709/224; 715/764
See application file for complete search history.

(56) References Cited

U.S. PATENT DOCUMENTS

| 6,029,165 | A  | * | 2/2000 | Gable ................... 707/999.003 |
| 6,233,583 | B1 | * | 5/2001 | Hoth ............................ 707/752 |
| 6,282,565 | B1 | * | 8/2001 | Shaw et al. .................. 709/206 |
| 6,941,304 | B2 | * | 9/2005 | Gainey et al. ................ 709/206 |
| 7,047,212 | B1 | * | 5/2006 | Pych et al. .................. 705/27.1 |
| 7,092,936 | B1 | * | 8/2006 | Alonso et al. ................ 707/737 |

(Continued)

OTHER PUBLICATIONS

Allemang, D. et al.—"COVE—Collaborative Ontology Visualization and Evolution"—Published in: Aerospace Conference, 2005 IEEE; Date of Conference: Mar. 5-12, 2005 Location Big Sky, MT and pp. 1-10.*

(Continued)

*Primary Examiner* — Anh Ly
(74) *Attorney, Agent, or Firm* — Heikki Einola; Judy Yee; Micky Minhas

(57) ABSTRACT

A unified search service may collect information related to an enterprise from at least one of publicly available data and private enterprise data. In some implementations, crowd sourcing may be used to determine a source list of one or more sources of information. Authored content can be generated, such as by combining one or more items of information from the public data with one or more items of information from the private enterprise data. Further, in some implementations, a public index may be generated from the public data, and one or more affiliation indexes may be generated from the private enterprise data. For example, a first affiliation index may contain confidential enterprise information, while a second affiliation index may contain non-confidential enterprise information. A user's affiliation to the enterprise may be taken into consideration when determining which indexes to use when responding to a search request from the user.

19 Claims, 13 Drawing Sheets

(56) References Cited

U.S. PATENT DOCUMENTS

| | | | |
|---|---|---|---|
| 7,363,320 B2* | 4/2008 | Patel ................. | 707/E17.014 |
| 7,587,617 B2* | 9/2009 | Margolus et al. ............ | 713/193 |
| 7,756,798 B2 | 7/2010 | Krishnaprasad et al. | |
| 7,783,630 B1 | 8/2010 | Chevalier et al. | |
| 8,281,125 B1* | 10/2012 | Briceno et al. ............... | 713/153 |
| 8,489,872 B1* | 7/2013 | Kapoor ......................... | 713/100 |
| 8,572,227 B2* | 10/2013 | Toomey et al. ............... | 709/223 |
| 2002/0099681 A1* | 7/2002 | Gainey et al. ..................... | 707/1 |
| 2003/0061204 A1 | 3/2003 | Parry | |
| 2003/0106039 A1* | 6/2003 | Rosnow et al. ............. | 717/100 |
| 2003/0144903 A1* | 7/2003 | Brechner et al. ............... | 705/14 |
| 2003/0233357 A1* | 12/2003 | Merenda et al. ................. | 707/5 |
| 2004/0148290 A1* | 7/2004 | Merenda et al. ............... | 707/10 |
| 2004/0186826 A1* | 9/2004 | Choi et al. ........................ | 707/3 |
| 2005/0234953 A1* | 10/2005 | Zhang et al. .................... | 707/101 |
| 2005/0237982 A1* | 10/2005 | Pankajakshan et al. ...... | 370/338 |
| 2005/0262342 A1* | 11/2005 | Field ............................... | 713/165 |
| 2006/0053172 A1* | 3/2006 | Gardner et al. .............. | 707/203 |
| 2006/0100912 A1* | 5/2006 | Kumar et al. ..................... | 705/4 |
| 2006/0173985 A1* | 8/2006 | Moore .......................... | 709/223 |
| 2007/0208746 A1* | 9/2007 | Koide et al. ........................ | 707/9 |
| 2007/0220268 A1* | 9/2007 | Krishnaprasad et al. ..... | 713/182 |
| 2007/0250784 A1* | 10/2007 | Riley et al. .................... | 715/764 |
| 2008/0168037 A1 | 7/2008 | Kapadia et al. | |
| 2008/0189163 A1* | 8/2008 | Rosenberg et al. ............... | 705/9 |
| 2008/0244429 A1* | 10/2008 | Stading .......................... | 715/764 |
| 2009/0063448 A1 | 3/2009 | DePue et al. | |
| 2009/0204590 A1* | 8/2009 | Yaskin et al. ..................... | 707/3 |
| 2009/0254572 A1* | 10/2009 | Redlich et al. .................. | 707/10 |
| 2009/0281792 A1* | 11/2009 | Green et al. ....................... | 704/9 |
| 2010/0010968 A1* | 1/2010 | Redlich et al. ......... | 707/E17.014 |
| 2010/0185611 A1* | 7/2010 | Liao et al. ..................... | 707/728 |
| 2010/0191562 A1* | 7/2010 | McFarland et al. ... | 707/E17.014 |
| 2010/0228711 A1 | 9/2010 | Li et al. | |
| 2010/0250497 A1* | 9/2010 | Redlich et al. ................. | 707/661 |
| 2010/0250644 A1* | 9/2010 | Toomey et al. ............... | 709/202 |
| 2010/0306213 A1* | 12/2010 | Taylor et al. .................. | 707/759 |
| 2012/0029970 A1* | 2/2012 | Stiles et al. ................... | 705/7.28 |
| 2012/0124015 A1* | 5/2012 | Abrams ......................... | 707/692 |
| 2012/0179656 A1* | 7/2012 | Bunte et al. ................... | 707/667 |
| 2012/0233209 A1* | 9/2012 | Cheng et al. .................. | 707/770 |

OTHER PUBLICATIONS

Dina Bitton et al. "One platform for mining structured and unstructured data: dream or reality?" Published in: Proceeding VLDB '06 Proceedings of the 32nd international conference on Very large data bases—2006 VLDB Endowment, Sep. 12-15, 2006, Seoul, Korea—pp. 1261-1262.*

Arnold, Stephen E.; Duplicates and Deduplication; Retrieved on Oct. 27, 2010 at http://arnoldit.com/wordpress/2008/12/29/duplicates-and-deduplication/; Beyond Search Published on Dec. 29, 2008, 7 pages.

Hester, Matt; Find Anything With Windows Desktop Search; Retrieved on Oct. 26, 2010 at http://download.microsoft.com/documents/uk/technet/downloads/technetmagazine/issue2/26_30_find_anything.pdf; TechNet Magazine; Published Oct. 2006, 5 pages.

Schabes, Yves; "How to Improve Enterprise Search"; Retrieved on Oct. 26, 2010 at http://www.eweek.com/c/a/IT-Management/How-to-Improve-Enterprise-Search/; eWeek.com; Published Jan. 10. 2008; 3 pages.

Microsoft Office SharePoint Server 2007 Evaluation Guide; Published Apr. 2008; http://webcache.googleusercontent.com/search?q=cache:tos9hSoaAAwJ:office.microsoft.com/download/afi; 68 pages.

Redefining Enterprise Search; Software Diversified Services ; 2008; http://www.sdusa.com/smartdocs/redefining-enterprise-search.pdf; 22 pages.

* cited by examiner

ENTERPRISE SEARCH OVER PRIVATE AND PUBLIC DATA

BACKGROUND

Information is available online from a huge variety of public sources, such as really simple syndication (RSS) feeds, social network (e.g. Facebook®, Myspace®) feeds, microblog (e.g., Twitter®) feeds, news websites, blog websites, podcasts and many other types of websites and online sources. For example, RSS is used to publish frequently updated information, such as news, blogs, and the like. Users may subscribe to one or more RSS feeds related to one or more subjects, and may use an RSS reader to continually receive the latest information on the subject collected from one or more online sources, such as news sites, blogs, microblogs and social networks. Additionally, social networks and microblog services may have their own feeds of information posted by users. Further, search engine websites and other websites that are publicly available provide access to recent news, blog entries, videos, images, discussions, real-time updates to social network pages, microblogs, and the like. Finally, there are "expert" or content directories available which list sources and pointers to topic-oriented information, which have been authored by humans and/or machine generated.

On the other hand, companies and other enterprises often have their own private intranets, internal libraries, internal databases, and the like. For example, an enterprise may provide a portal used by employees for accessing the enterprise's intranet to stay informed of news and developments within the company, and otherwise make productive use of the enterprise's intranet. Further many enterprises have network-accessible libraries that can enable employees (and sometimes members of the public) to access business and technical research resources, white papers, eBooks, print books, industry reports, company information, conference proceedings, journals and the like. Additionally, many enterprises have internal databases that contain a wealth of information that can be of use to company employees for various different purposes. However, because access to a large portion of enterprise information is typically private or otherwise limited to preserve security and confidentiality, a user generally has to conduct separate searches of public sources and enterprise sources when researching a subject.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques for a unified search service able to access and utilize both public data and private enterprise data. In some implementations, the unified search service may create combined information from the public data and private enterprise data. Determining the list of sources and ranking of items can be ranked via traditional search methods, or can be crowd sourced by votes from users either explicitly or implicitly. Change history of crowd-sourced changes can be retained to reduce authoring conflicts and improve quality. As one example, the public data and the private enterprise data may be indexed to generate one or more indexes that may be used to respond to search queries. As another example, collected public data and private enterprise data may be used to generate authored content related to one or more identified subjects.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Searching Private and Public Data

Figure 1:
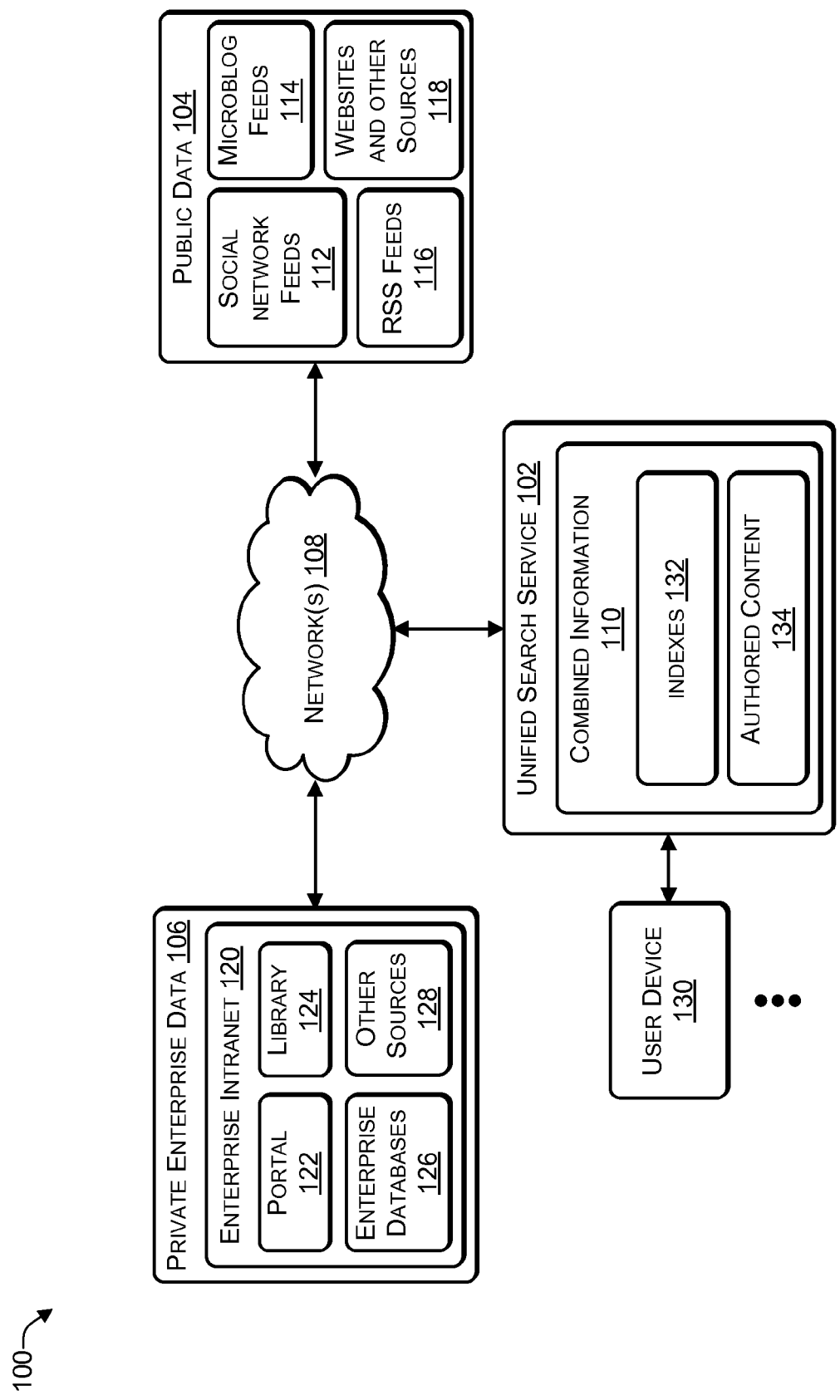
FIG. 1 illustrates an example framework for providing a unified search service according to some implementations.

The technologies described herein generally relate to a unified search service able to access and utilize both public data and private enterprise data. In some implementations, the unified search service may use the gathered data to create combined information from both the public data and private enterprise data. For example, the public data and the private enterprise data may be indexed to generate one or more indexes. The one or more indexes may be used to provide combined information to users in response to a search request without sharing private data with unauthorized users. As another example, the combined information may be provided to subscribing users in an RSS-type feed or news page. As yet another example, the public data and enterprise data may be combined in a news page delivered to a user via email, or an enterprise portal page that is displayed to a user when accessing the enterprise portal. In some implementations, one or more pages may be authored automatically (or semi-automatically) by combining enterprise data and public data based on identification of related subject matter in located items of information.

As mentioned above, in some implementations the unified search service may generate one or more search indexes. The search indexes may include a public index generated from the public data and one or more affiliation indexes generated from the private enterprise data. The affiliation indexes may include an enterprise-internal index and an enterprise-external index that are used to provide information based on an affiliation of a user with the enterprise. For example, the internal index may be used to provide information only to individuals affiliated with the enterprise, e.g., employees or other users authorized to access particular enterprise information. Further the external index may be used to provide enterprise information to users whose affiliation is external to the enterprise, such as members of the public who desire information from the enterprise. For example, the external index may provide access to enterprise information that is not confidential to the enterprise, but which is not otherwise publicly disseminated or publicly available.

Furthermore, some implementations may improve the relevance of search results, such as by improving relevance of a search of public data based on knowledge of private data. For example, when a user submits a search query, the affiliation of the user may be determined as being affiliated with the enterprise. As a result, the relevance of the search results may be adjusted based on knowledge of the enterprise private data, such as through use of an enterprise-specific lexicon of terms, taxonomy of technology, knowledge of enterprise product names, names of enterprise projects, or the like. Accordingly, the user's affiliation with respect to an enterprise may be taken into consideration when ranking search results, selecting information to be provided to the user, such as in a news feed, or the like.

Additionally, in some implementations, the search service may also include an authoring module for automatically or semi-automatically authoring content, such as one or more news pages, portal pages, or RSS feeds. For example, the search service may gather information from enterprise private data and public data based on a determined relevance and through the application of one or more filters, selected keywords, or the like. A cross-referencing module may be used to identify information related to particular subjects in the enterprise data and the public data. This cross-referenced information obtained from the enterprise data and the public data can be combined to generate news articles, news feeds, portal pages, or the like, on particular subjects. Ability to access or receive the new pages or news feeds may also be dependent on an affiliation of the recipient.

In some implementations, the unified search service may be executed on one or more enterprise computing devices so that both the public information gathering and indexing, and the private enterprise information gathering and indexing are performed by the one or more enterprise computing devices. In other implementations, the unified search service may be provided by a combination of enterprise computing devices and third-party search service computing devices. For example, the enterprise computing devices may perform information gathering and indexing of the enterprise data, while computing devices of a third-party search service may be employed for carrying out the public data gathering and indexing as a service provided to the enterprise. In yet another alternative implementation, the unified search service may be provided by a third-party search service authorized to perform searching of both public data and private enterprise data for one or more different enterprises. The third-party search service may employ a suitable security component for maintaining confidentiality of each enterprise's information. Thus, the third-party search service may provide public indexes, enterprise-affiliation-based indexes and authored content to each enterprise.

In some implementations, sources can be added to or removed from the search index. These sources can be added manually or automatically to a source list that may be used for generating at least some of the indexes. The updating of the source list can be static, at a known interval or triggered by an event, dynamic, or use a program to determine optimal updating. When manually adding/removing sources, the individuals and groups allowed to edit the source list can be open to the public, or may be restricted in a variety of ways (e.g., restricted to specific individuals, require group membership, require prior usage or contributions to the site, require some type of access control such as a password, and the like). When automatically adding/removing sources, implementations herein can use a variety of types of sources including social networks, enterprise internal sources, web search, etc. For example, there are a variety of services which provide topical, ranked directories of Twitter® or Facebook® accounts. The updating of the source list can be performed one time (for example, for the "bootstrapping" of a new company page), or can be dynamically or programmatically authored. Finally, all changes to the source list can be stored (including the time, the author, the change, the item, the pointer, etc.), and can be reverted if needed.

Example Framework

FIG. 1 illustrates an example framework 100 for providing a unified search service 102 according to some implementations. In the illustrated example, the unified search service 102 is configured to access public data 104 and private enterprise data 106 over one or more network(s) 108 to generate combined information 110. Network(s) 108 may include the Internet, a local area network (LAN), a wide area network (WAN), a wireless network, other suitable communication network, or a combination of networks enabling communication between unified search service 102 and public data 104 and enterprise data 106.

Public data 104 may include a variety of data sources such as social network feeds 112, microblog feeds 114, RSS feeds 116, and websites and other sources 118. For example, the unified search service 102 may access one or more social network feeds available through social network sites such as Facebook®, MySpace®, Linkedin®, Bebo™, Friendster®, Hi5™, Orkut™, Classmates™, Perfspot™, Zorpia™, Netlog™, Habbo™, etc. Further, the unified search service 102 may access one or more microblog feeds available from microblog sites, such as Twitter®, Tumblr®, Jaiku™, Plurk™, Emote.in™, PingGadget™, Beeing™, Identi.ca™, Foursquare™, and the like. Additionally, the unified search service 102 may access one or more RSS feeds available from RSS sources, such as the Associated Press®, MSNBC™, BBC®, CNN®, the Wall Street Journal®, Yahoo!® News, The New York Times®, Popular Science®, Scientific American®, and NPR®, to name a few. The unified search service 102 may also access a variety of other websites and online sources, such as third-party search sites, news sites, blog sites, and the like. From some or all of these sources, the unified search service 102 may automatically gather public data 104 relevant to the enterprise by using various filters, keywords, and other searching and data mining techniques, as discussed additionally below.

The unified search service 102 may collect private enterprise data 106 from various private enterprise sources such as may be accessed through an enterprise intranet 120. For example, private enterprise sources available through the enterprise intranet 120 may include an enterprise portal 122, an enterprise library 124, one or more enterprise databases 126, and other enterprise sources 128. The enterprise portal 122 may include content related to the enterprise authored by enterprise employees or other sources. For example, the enterprise portal 122 may include a home page that provides official announcements, latest enterprise news, a list of available enterprise resources, access to an employee directory, and the like. The enterprise library 124 may include both proprietary and nonproprietary documents published by the enterprise and made available to those with access to the library 124. For example, portions of the library such as published white papers and journal articles might be available to members of the public, while other documents contained in the library, such as proprietary manuals, internal memos, enterprise procedures, and the like, might only be available to employees of the enterprise or others with authorized access. The library 124 may also contain other publications that relate to the enterprise products, business focus, specialties and services, or the like. For example, a biotech enterprise may maintain a collection of scholarly papers and journals related to particular fields of research in the biotech industry. The unified search service 102 also may collect private enterprise data 106 from one or more databases 126 maintained by or for the enterprise, depending on the type of enterprise, and the types of databases that the enterprise has. Additionally, other enterprise sources 128 might be available to only enterprise employees or particular authorized enterprise employees. Examples of other enterprise sources might include documents, such as word processing documents, emails, and the like, stored on enterprise servers. For instance, the unified search service 102 may search word processing documents stored on enterprise servers for documents relating to particular subjects such as enterprise projects, products, news items, or the like.

The unified search service 102 may employ the collected private enterprise data 106 and the public data 104 in a number of different ways to generate combined information 110 that can be provided to one or more user devices 130. For example, as described additionally below, the unified search service may generate one or more indexes 132 based on the private enterprise data 106 and the public data 104 to be used when providing combined enterprise information and public information in response to a search query received from a user device 130. Thus, an enterprise employee may use user device 130 to submit a single search query directed to a particular subject. In response, the unified search service 102 may provide combined information 110 that includes both private enterprise data 106 and public data 104 relevant to the particular subject of the search query in a single page of search results provided to the enterprise employee. Accordingly, employees utilizing the unified search service 102 do not have to conduct separate searches of public data and private enterprise data when researching a particular subject. Further, the ranking of the results may be adjusted based on knowledge of the private enterprise data. For example, a search that pertains to specific terms that are relevant to the enterprise, such as product names, company projects, company names, technology areas, technical fields, and the like may be ranked more highly than would be case if a member of the public were searching public data. As another example, the unified search service 102 may automatically or semi-automatically generate authored content, such as a news page or RSS feed related to the enterprise. For instance, such a news page may contain information relevant to a particular subject obtained from both the private enterprise data 106 the public data 104, may relay the latest news about the enterprise in general, or the like, to enterprise employees or other authorized recipients. Additional uses and functions of the unified search service are discussed below.

Example Process for Unified Search

Figure 2:
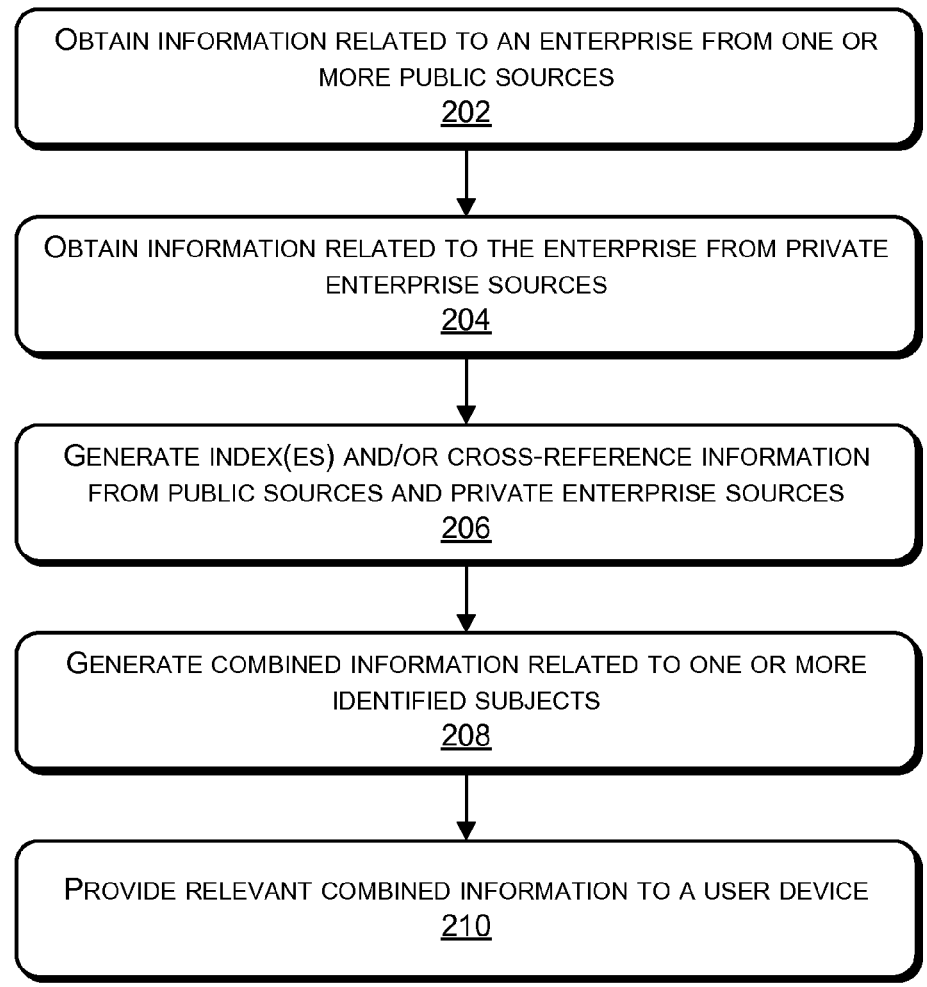
FIG. 2 is a flow diagram of an example process carried out by a unified search service for providing combined information according to some implementations.

FIG. 2 is a flow diagram of an example process 200 for a unified search service according to some implementations herein. In the flow diagram of FIG. 2, as well as in the flow diagrams of FIGS. 5 and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include modules, programs, objects, components, data structures, and the like that perform particular functions or implement particular abstract data types. The order in which the blocks are described is not intended to be construed as a limitation, and any number of the described operations can be combined in any order and/or in parallel to implement the process. For discussion purposes, the process 200 is described with reference to the framework 100 of FIG. 1, although other frameworks, devices, systems and environments may implement this process.

At block 202, the unified search service 102 obtains information related to an enterprise from one or more public online sources. For example, the unified search service 102 may obtain information related to the enterprise, enterprise projects, enterprise products, enterprise services, or the like, from one or more of social network feeds 112, micro-blog feeds 114, RSS feeds 116, and websites and other sources 118.

At block 204, the unified search service 102 obtains private information related to the enterprise from one or more private enterprise sources, such as through a private enterprise intranet 120. For example, the unified search service 102 may use the enterprise intranet 120 to access one or more of an enterprise portal 122, an enterprise library 124, one or more enterprise databases 126, and/or other enterprise sources 128.

At block 206, the unified search service 102 may generate one or more indexes and/or cross-reference the public information with the private information to identify related subjects. For example, the unified search service may be configured to automatically gather and identify information related to one or more subjects related to the enterprise. Examples of such subjects may include enterprise product lines, enterprise services, newsworthy events related to the enterprise, such as contract bids and outcomes, enterprise stock values, business deals, and the like. Additionally, the unified search service may also generate one or more indexes from the collected information to enable responding to search queries.

At block 208, the unified search service generates, based on the cross-referencing, combined information by combining a portion of the public information related to a particular subject with a portion of the private information related to the particular subject. Thus, information on particular subjects collected from both private and public sources may be de-duplicated and combined to generate combined information to be provided to one or more users. For example, in some implementations, the information may be combined in a news feed, or a news page on the particular subject. Such a news feed or news page may be authored automatically or semi-automatically, i.e., with no or little human oversight. Additionally, in other implementations, the combined information may be generated as a search results determined to relate to a particular keyword or subject in response to a user submitted search query.

At block 210, the combined information is provided to one or more users. For example, the combined information may be provided to a user as a search results page in response to a search query submitted by a user. In other implementations, the combined information may be a news page provided to a user as a portal page, in an email, or the like. Alternatively, the combined information may be provided in an RSS-style news feed. Various other techniques for utilizing and disseminating the combined information are also contemplated herein, with the foregoing being just several examples.

Example Framework for Unified Search Service

Figure 3:
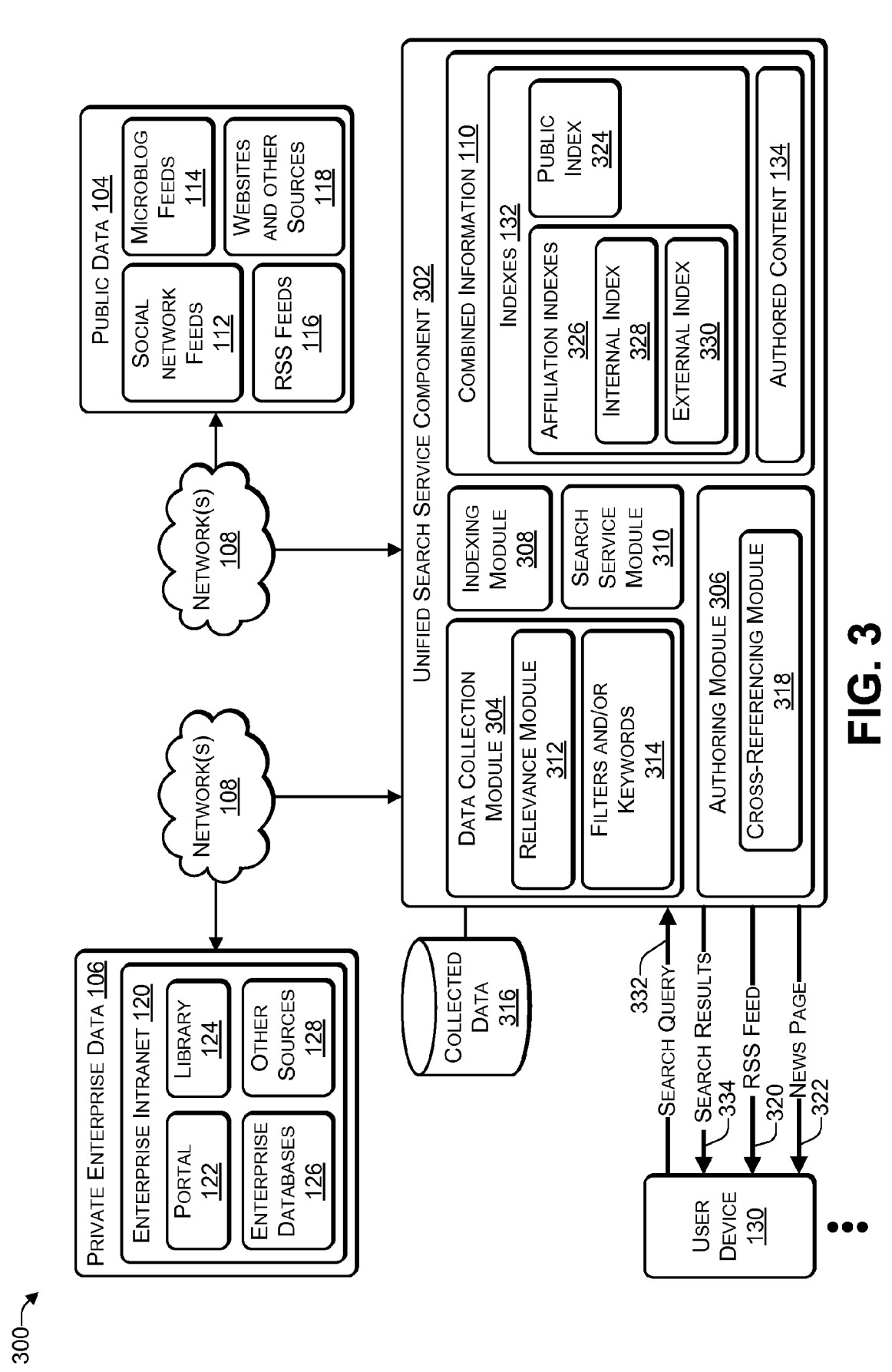
FIG. 3 is a block diagram of an example framework for a unified search service according to some implementations.

FIG. 3 is a block diagram of an example framework 300 for a unified search service according to some implementations. Framework 300 includes a unified search service component 302 which may access public data 104 through one or more networks 108, such as the Internet or other suitable network. Unified search service component 302 may also access private enterprise data 106 through one or more wired or wireless networks 108 such as a LAN, WAN, the Internet or other suitable connection. In some implementations, unified search service component 302 may be implemented on one or more enterprise computing devices, which may be in the same location or in a separate location from one or more computing devices that maintain private enterprise data 106. Alternatively, unified search service component 302 may be implemented on one or more computing devices of a third-party search service, as discussed additionally below with reference to FIG. 7. As yet another alternative, the unified search service may be implemented in part on enterprise computing devices and in part on third-party search service computing devices, as discussed additionally below with reference to FIG. 9.

In the illustrated example, unified search service component 302 includes a data collection module 304, an authoring module 306, an indexing module 308, and a search service module 310. The data collection module 304 includes a relevance module 312 that gathers information determined to be relevant to the enterprise based on one or more filters and/or keywords 314. For example, the relevance module 312 may be configured to access one or more of the social network feeds 112, the micro-blog feeds 114, the RSS feeds 116, and the websites and other sources 118 using one or more filters or filtering options provided by the feeds and/or websites. In some cases, one or more keywords may be used, selected for relevancy to the enterprise or the information desired to be gathered for the enterprise. Examples of suitable keywords may include the enterprise name, a product of the enterprise, a service provided by the enterprise, a name of a competitor's product, or other subjects relevant to the enterprise. Relevance module 312 may also access the enterprise intranet 120 to obtain relevant private enterprise data 106 from one or more of the enterprise portal 122, the enterprise library 124, enterprise databases 126, and/or other enterprise sources 128 based on the filters and/or keywords 314. In some implementations, data collection module 304 may store information gathered from the public data 104 and the private enterprise data 106 in a suitable storage location as collected data 316.

The collected data 316 may be accessed by the authoring module 306 and/or the indexing module 308 for generating combined information 110. Authoring module 306 may include a cross-referencing module 318 configured to cross-reference the collected data 316 to identify portions of private enterprise data 106 and public data 104 directed to the same or similar subjects. As one example, cross-referencing module 318 may identify from the public data 104 one or more posts, articles, or other items of information directed to a particular subject. Cross referencing module 318 may also identify from private enterprise data 106 one or more posts, articles, or other items of information directed to the particular subject. Thus, suppose the cross-referencing module 318 identifies, from the public data 104, an item of information related to the particular subject as a first item of interest and identifies, from the private enterprise data, another item of information related to the particular subject as a second item of interest. The cross-referencing module 316 may check to determine that first item and second item are not duplicates of each other, or of previously posted items, by comparing the texts, images, etc., of the items. If the two items are not duplicates, the authoring module 306 may include one or both of the items in authored content 134. For example, based on a determined relevance to a particular subject, such as the frequency of one or more keywords related to the subject occurring in each of the first and second items, the authoring module 306 may include one or both of the items in an RSS feed 320 or a news page 322 provided to one or more user devices 130.

In the case of RSS feed 320, in some implementations, the authored content 134 may be automatically compiled and provided in near real time in RSS feed 320 as the collected data 316 is gathered from the private enterprise data 106 and public data 104. Alternatively, in some implementations, prior to delivery to the one or more user computing devices, the automatically compiled RSS feed 320 may first be reviewed by a human to ensure accuracy and suitability of the content. As yet another alternative, the content may be automatically reviewed prior to delivery by the authoring module 306 using various filters to detect unsuitable language, unsuitable topics, unsuitable images, false or misleading information, or the like. Additionally, as the authored content 134 may contain enterprise confidential or proprietary information, in some implementations, suitable access controls may be provided to ensure that only authorized recipients are able to receive the authored content 134.

Furthermore, in the case of news page 322, the news page 322 may be automatically assembled based on the relevancy to one or more particular subjects identified by the cross-referencing module 318. In a fully automated authoring implementation, following assembly of the news page 322 based on determined relevancy of selected items to a particular subject, the assembled news page 322 may be forwarded to one or more user devices, posted on the enterprise portal 122, or otherwise made available or provided to recipients. Alternatively, in a semi-automatic authoring implementation, the assembled news page 322 may first be reviewed by a human to ensure accuracy and suitability of the content. As yet another alternative, the content of the news page 322 may be automatically reviewed by the authoring module 306 using various filters to detect unsuitable language, unsuitable topics, unsuitable images, false or misleading information, or the like, prior to delivery or posting.

The indexing module 308 may utilize the collected data 316 for generating one or more indexes 132 based on the collected data 316. The indexing module 308 may be implemented in addition to authoring module 306, or as an alternative to authoring module 306. In the illustrated example, indexing module 308 generates a public index 324 from the collected public data 104, and one or more affiliation indexes 326 from the collected private enterprise data 106. The indexes 132 may be any suitable type of index to enable identification and location of content. As one example, the indexes 132 may be inverted or reverse-key indexes of the type conventionally generated by third-party search services based on words identified in the collected data, word prominence, word frequency, etc.

In the illustrated example, affiliation indexes 326 include an internal index 328 and an external index 330. For example, internal index 328 may be generated to include information determined to be confidential, private, or sensitive to the enterprise. Accordingly, internal index 328 may be used to provide search results to a user who has demonstrated an affiliation or authorization to access the confidential enterprise information. On the other hand external index 330 may include only information obtained from the private enterprise data that is not confidential or sensitive to the enterprise. For example, non-confidential portions of enterprise library 124 or enterprise portal 122, and the like, that are not otherwise publicly available may be made accessible to the public and only these portions of the private enterprise data 106 may be included in the external index 330.

As described additionally below with reference to FIG. 6, when the search service module 310 of unified search service component 302 receives a search query 332 from a user device 130, the search service module 310 may determine an affiliation of the user prior to providing search results 334. For example, when the user of the user device 130 is determined to have an affiliation with the enterprise, the search service module 310 may provide search results 334 from both the public index 324 and the internal index 328. On the other hand, when the user of the user device 130 is determined to not have an affiliation with the enterprise, the search service module 310 may provide search results 334 from the public index 324 and the external index 330.

Additionally, the search service module 310 may also consider the affiliation of a user with the enterprise when ranking search results 334. For example, some implementations may improve the relevance of search results 334 based on knowledge of private data. For example, when a user submits search query 332, the affiliation of the user of user device 130 may be determined as being affiliated with the enterprise. As a result, the relevance of the search results 332 may be adjusted based on knowledge of the enterprise private data, such as through use of an enterprise-specific lexicon of terms, taxonomy of technology, knowledge of enterprise product names, names of enterprise projects, or other private enterprise data 106. Accordingly, the user's affiliation with respect to the enterprise may be taken into consideration when ranking search results 332, or when selecting information to be provided to the user device 130 in RSS feed 320 or news feed 322.

Example Authored Content

Figure 4A:
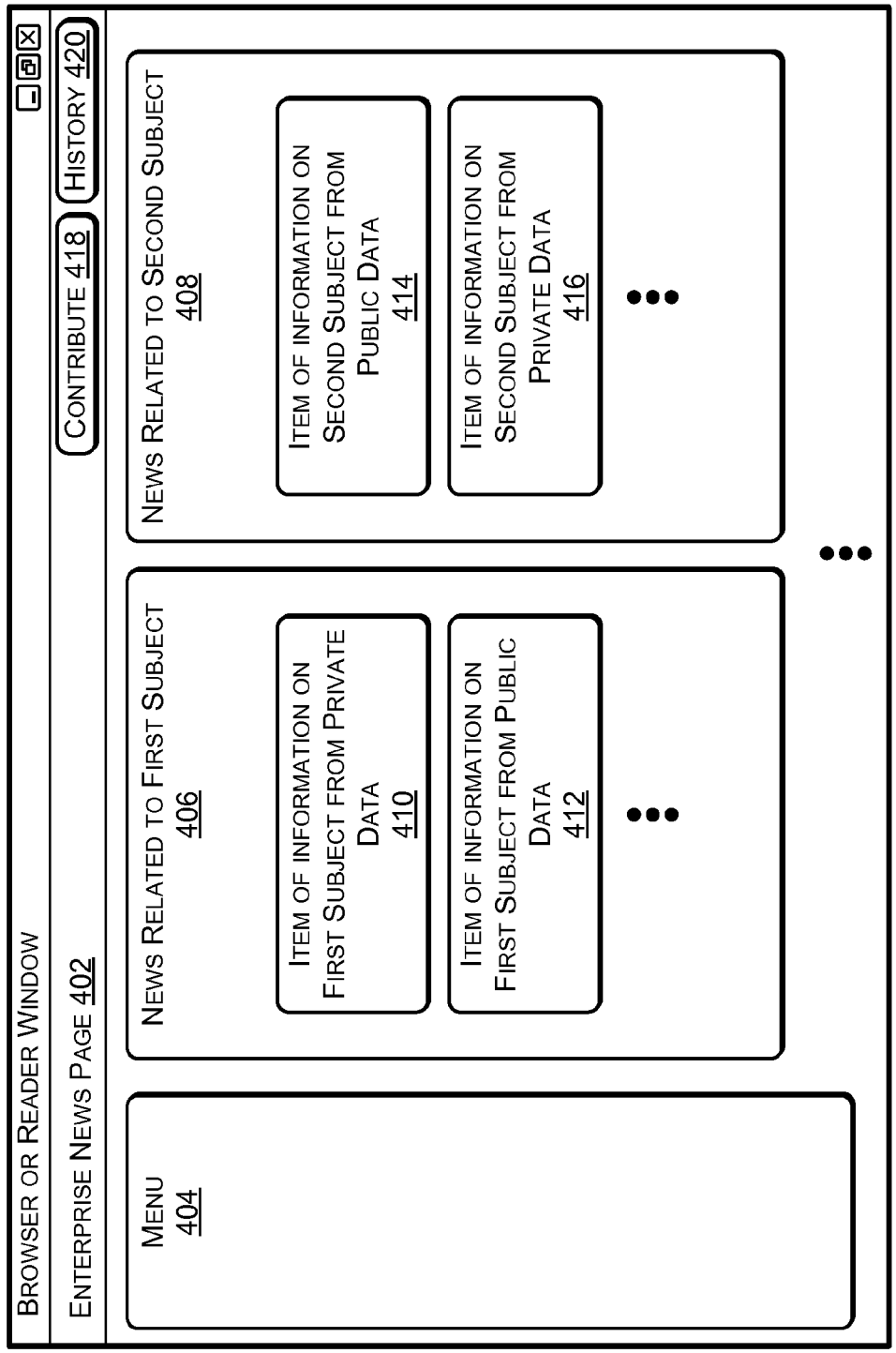
FIGS. 4A-4C illustrate an example layout of an authored page or feed that may include the ability to add or remove sources according to some implementations.

FIG. 4A illustrates an example of a browser or RSS reader window 400 according to some implementations that contains authored content including combined information obtained from the public information 104 and the private enterprise information 106. In this example, the browser or reader window 400 provides an enterprise news page 402 containing news related to the enterprise. However, in other implementations, the browser or reader window may provide authored content directed to particular subjects, such as a particular product of the enterprise, particular services of the enterprise, or the like.

In the illustrated example, the enterprise news page 402 includes a menu 404, news related to a first subject 406, and news related to a second subject 408. Menu 404 may be used to control the settings of the enterprise news page 402, such as for controlling which subjects are displayed, the order of display, and various other options. The news related to each subject may include at least one of information from public data 104 and information from private enterprise data 106. Accordingly, the news related to the first subject 406 may include an item of information 410 on the first subject from private data and an item of information 412 on the first subject from public data. Similarly, news related to the second subject 408 may include an item of information 414 on the second subject from public data and an item of information 416 on the second subject from private data.

As one example, suppose that the first subject relates to a particular product of the enterprise and the second subject relates to a particular service provided by the enterprise. Further suppose that cross-referencing module 318 identifies a post from a social network feed 112 directed to the particular product of the enterprise as the first item of information 410, and identifies an announcement from the enterprise portal 122 directed to the particular product as the second item of information 412. For instance, the cross-referencing module 316 may identify the use of the product name, enterprise name, etc., a predetermined number of times in each of the items of information 410 and 412. The cross-referencing module 318 may also check to determine that these two items of information 410 and 412 are not duplicates of each other or other previously posted news items by comparing the texts of the items, sources of the items, etc. If the two items of information 410 and 412 are not duplicates, the authoring module 306 may include one or both of the items of information 410 and 412 in the enterprise news page 402 as news related to the first subject. Similarly, the cross-referencing module 318 may identify items of information 414 and 416 from the public data 104 and private enterprise data 106, respectively, related to the second subject, and post these items of information 414 and 416 as news related to the second subject 408.

In some implementations, whether to include a particular item of information, and the position of each identified item relative to others, may be based on a determined relevance to the particular subject. Relevance may be determined based on a number of different factors, such as the frequency of one or more keywords related to the subject occurring in each of the items, a source of the item, or the like. For example, items that have a higher frequency of a particular keyword, such as a product name, might be ranked in a higher or more prominent position than those items having a lower frequency of the particular keyword. Also, some items might be tagged by a poster as relating to a particular subject. Additionally, in some implementations, the source of the item may be taken into consideration. For example, when the source is the enterprise intranet, the relevance and accuracy of the item may be presumed to be relatively high. On the other hand, when the source of an item of information is the public data 104, additional factors might be considered such as an identity of the author of the item, or the like. For example, if the item is a post from a social network or microblog, and the author of the post is an identified employee of the enterprise, then the item may be considered to be more relevant than if the post is from a nonemployee or an anonymous source. These various considerations of relevancy may be incorporated into an algorithm or machine learning model used by the authoring module 306 for determining which items to include in the combined information.

Furthermore, as discussed above, the enterprise news page 402 may be automatically authored or semi-automatically authored. For instance, the enterprise news page 402 may be automatically authored by assembling based on determined relevance to particular subjects, and then forwarded to one or more user devices, posted to the enterprise portal, or the like.

The automatic authoring may include an automatic review of the content for appropriateness and accuracy. Alternatively, the enterprise news page 402 may be semi-automatically authored by assembling the page in the manner described above, and subjecting the page to human review before forwarding or posting the page. The semi-automatic authoring may still include an automatic review of the content for appropriateness and accuracy conducted by the authoring module 306 prior to or following human review.

Additionally, the sources of information represented on news page 402 may be changed manually or dynamically. For example, the news page 402 may include a contribute button 418 that enables one or more users to add sources and a history button 420 that enables monitoring of sources added, deletion of sources from the source list, and the like. For example, as mentioned above, sources can be added to, or removed from, the news page 402 and/or the indexes 132 in general. The sources can be added manually or automatically to the source list that may be used for generating at least some of the indexes and/or the authored content, such as news page 402. The updating of the source list can be static, performed manually, or performed dynamically, such as at a known interval, triggered by an event, or managed by a program to determine optimal updating. For example, when manual addition and/or removal of sources is enabled, individuals and groups allowed to edit the source list can be restricted in a variety of ways (e.g., restricted to specific individuals, require group membership, require prior usage or contributions to the site, require some type of access control, such as a password, and the like). However, in other implementations, the addition of sources and removal of sources may be permitted to anyone able to access a particular page, index, enterprise or the like.

Figure 4B:
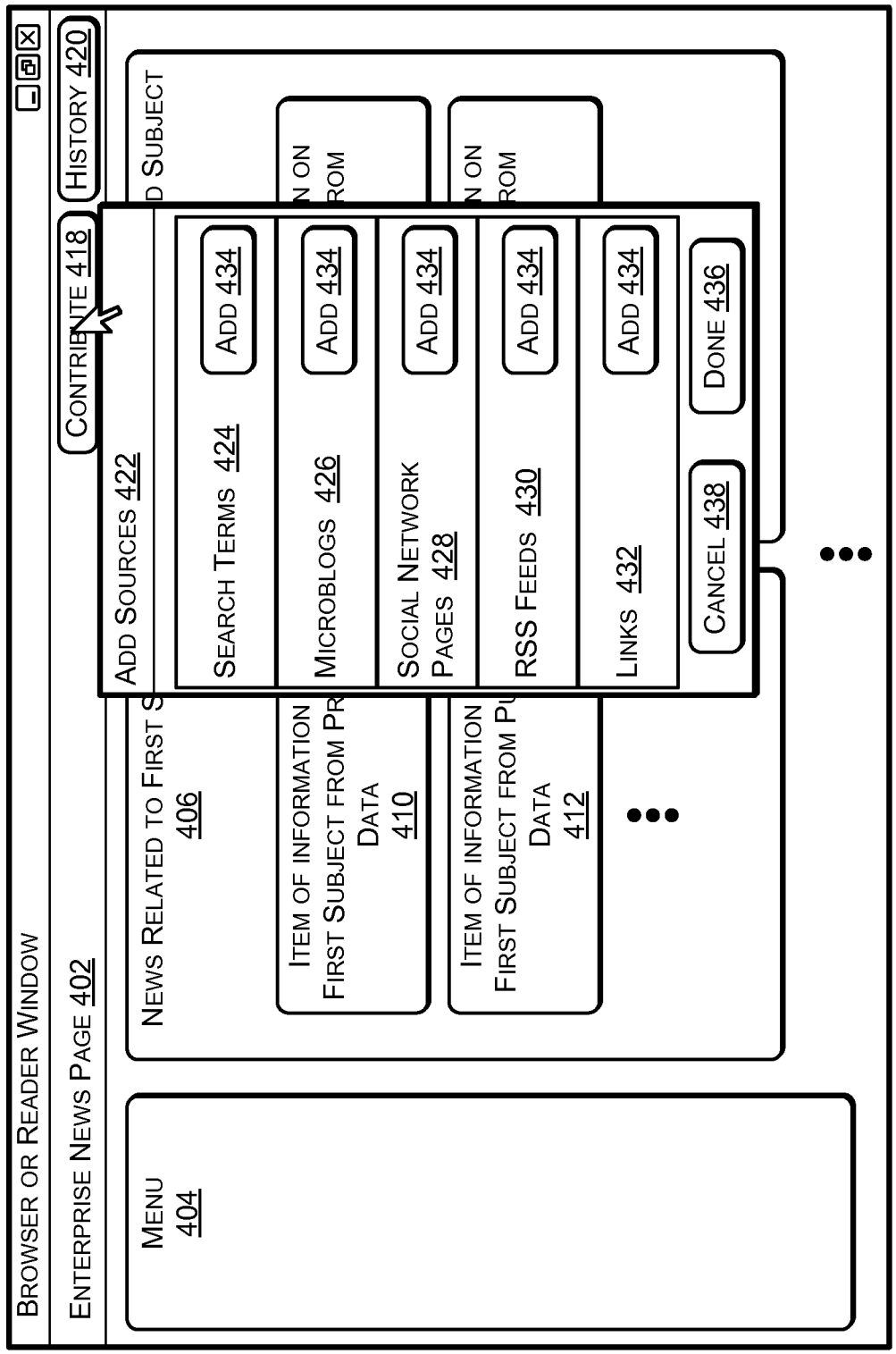

FIG. 4B illustrates one example of an implementation for adding sources, although numerous other alternative techniques and arrangements may be used. In FIG. 4B, a user may select the contribute button 418, which provides a dropdown add-source menu 422 containing options for adding sources. Implementations herein can use a variety of types of sources including social networks, enterprise internal sources, web searches, RSS feeds, and the like. In the illustrated example of FIG. 4B, examples of sources that may be added include search terms 424, microblog pages or users 426, social network pages 428, RSS feeds 430, and web links 432. A user may select one or more of these sources by clicking on an add button 434 to provide additional information, such as the name of the source, a link to the source, or the like. When the user is finished contributing to the source list, the user may select a done button 436 to close the add-source menu 422. All changes to the source list can be stored (including the time, the user who made the change, details of the change or the item added, and so forth). Accordingly, some implementations herein are able to use the collective knowledge of a plurality of individuals for establishing the sources that provide the information for the indexes 132 and/or the authored content.

Figure 4C:
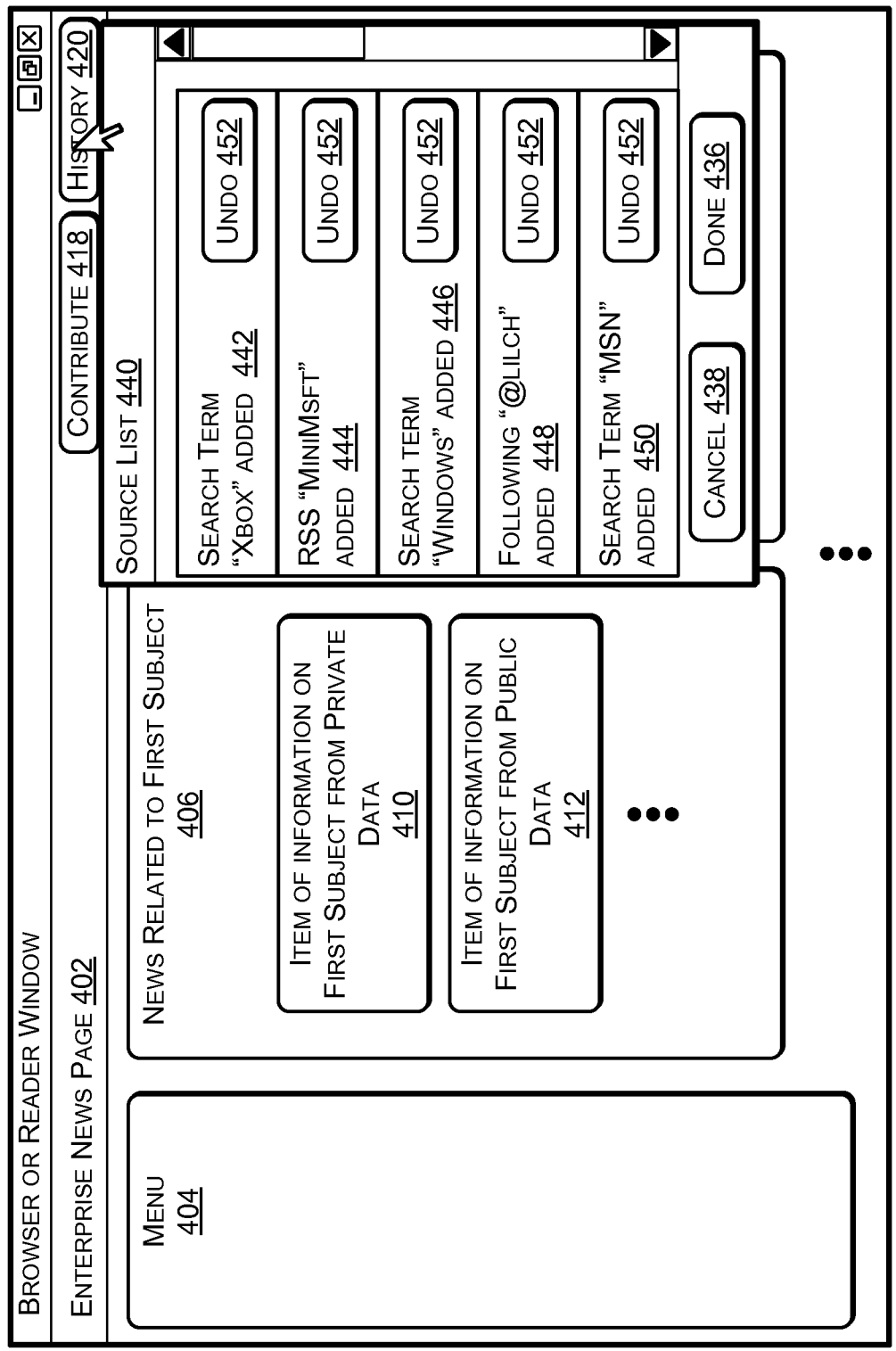

As illustrated in FIG. 4C, a source list 440, including any changes, may be reviewed and reverted if desired. In the example of FIG. 4C, by clicking on the history button 420, the source list 440 may be displayed including a history of changes to the source list 440, such as in chronological order of most recent changes. For example, the source list 440 may include a listing of each source, when the source was added, by whom, details of the source, and the like. In the illustrated example, the source list 440 displays sources 442-450 that were recently added. An undo button 452 may be provided adjacent to each listed source 442-450 to enable the removal of a source determined to be no longer desired. For example, in some implementations one or more authorized users may be authorized to remove sources from the source list 440, while in other implementations, any user may be authorized to remove sources of the source list 440. The removal of the source and the name of the user that removed the source may be documented in the history in the source list 440 to prevent abuse. Accordingly, some implementations may provide for "crowd sourcing," whereby diverse knowledge and experience of multiple users is applied to determine the sources of information that are most suitable for a particular forum, context, or the like. Further, the foregoing provides several non-limiting examples of possible techniques for managing the sources, the source list, and the authored content. Numerous other possible variations will be apparent to those of skill in the art in view of the disclosure herein.

Example Process for Generating Authored Combined Public and Private Information

Figure 5:
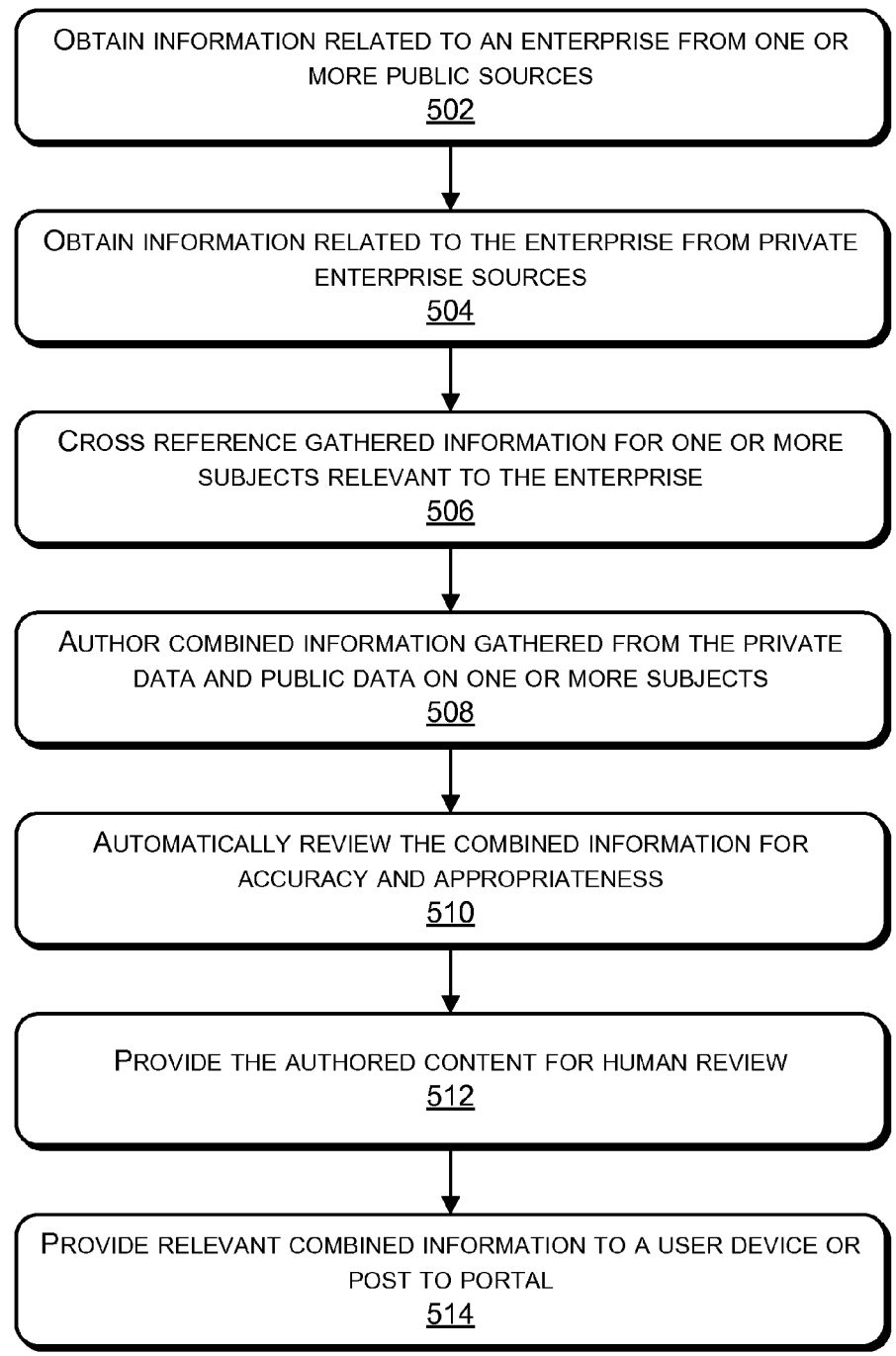
FIG. 5 is a flow diagram of an example process for providing authored combined information according to some implementations.

FIG. 5 is a flow diagram of an example process 500 for generating combined public and private enterprise information according to some implementations herein. For discussion purposes, the process 600 is described with reference to the framework 300 of FIG. 3, although other frameworks, devices, systems and environments may implement this process.

At block 502, the data collection module 304 obtains information related to an enterprise from one or more public online sources. For example, the data collection module 304 may obtain information related to the enterprise, enterprise projects, enterprise products, enterprise services, or the like, from one or more of social network feeds 112, micro-blog feeds 114, RSS feeds 116, and websites and other sources 118.

At block 504, the data collection module 304 obtains private information related to the enterprise from one or more enterprise sources, such as through a private enterprise intranet 120. For example, the data collection module 304 may use the enterprise intranet 120 to access one or more of an enterprise portal 122, an enterprise library 124, one or more enterprise databases 126, and/or other enterprise sources 128.

At block 506, the cross-referencing module 318 may cross-reference the public information with the private information to identify related subjects. For example, the unified search service may be configured to automatically gather and identify information related to one or more subjects that pertain to the enterprise. Examples of such subjects may include enterprise product lines, enterprise services, newsworthy events related to the enterprises, such as contract bids and outcomes, enterprise stock values, competitor products, and the like.

At block 508, the authoring module 306 generates, based on the cross-referencing, combined information by authoring one more news pages or news feeds directed to one or more identified subjects that pertain to the enterprise. For example, the authoring module 306 may combine a portion of the public information related to a particular subject with a portion of the private information related to the particular subject in a news page or RSS feed. Thus, information on particular subjects collected from both private and public sources may be de-duplicated and combined to generate combined information. The news feed or news page may be authored automatically or semi-automatically, i.e., with no or little human oversight.

At block 510, the authored content may be automatically reviewed for accuracy appropriateness and suitability. For example, the authored content may be reviewed by the authoring module 306 to remove items containing inappropriate words, images or subjects, foul language, false or misleading information, or the like.

At block 512, optionally the content may be subject to human review for approval prior to posting the content or forwarding the content to one or more user devices. In some implementations, the order of blocks 510 and 512 may be reversed.

At block 514, the combined information is provided to one or more users. For example, the authored combined information may be a news page provided to a user device as a portal page, in an email, or the like. Alternatively, the authored combined information may be provided in an RSS-style news feed. Various other techniques for utilizing and disseminating the combined information are also contemplated herein, with the foregoing being just several examples.

Example Framework Employing Affiliation Indexes

Figure 6:
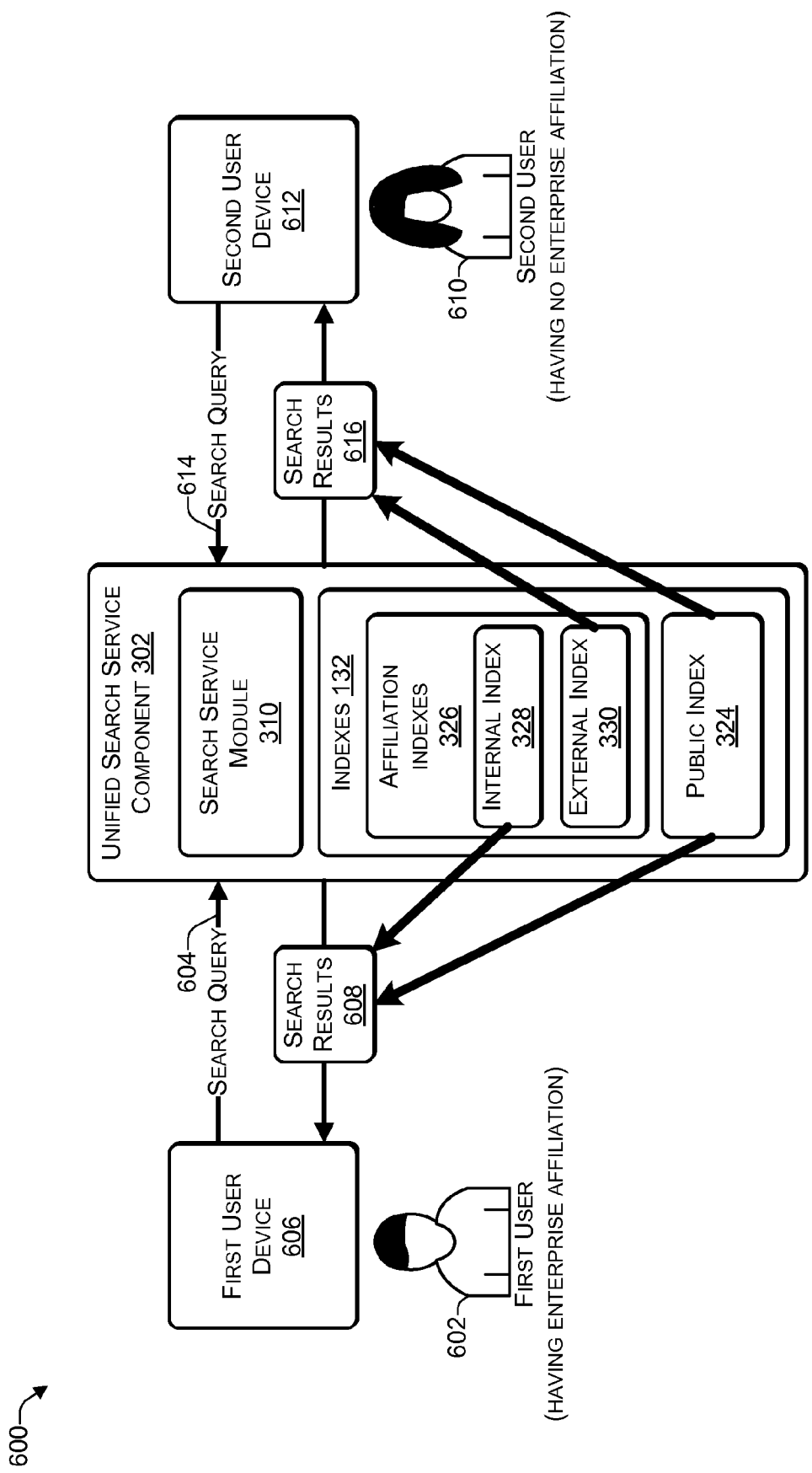
FIG. 6 is a block diagram of an example framework employing affiliation-based indexes according to some implementations.

FIG. 6 is a block diagram of an example framework 600 illustrating utilization of the affiliation indexes according to some implementations, with of some portions of unified search service component 302 not shown in this figure for clarity purposes. In the example of FIG. 6, a first user 602 submits a search query 604 from a first user device 606 to the search service module 310 of unified search service component 302. The search service module determines an affiliation of the first user 602 prior to responding to the search query 604. For example, the search service module 310 may determine whether the first user 602 is logged in as an employee of the enterprise or is otherwise officially authorized to access private enterprise information. If the first user 602 is not logged in or authorized, the search service module 310 may present a page requiring the first user 602 to login or provide authorization. Alternatively, the search service module 310 may determine that the first user device 606 is a user device of the enterprise and may rely on this identification as sufficient proof of affiliation of the first user 602. For example, the first user device 606 may be an authorized device that is part of a local area network of the enterprise, or the like. Various other techniques may also be used for determining whether the first user 602 has an enterprise affiliation.

When the search service module 310 has determined that the first user 602 has and enterprise affiliation, the search service module 310 may access the indexes 132 to provide search results 608 in response to the search query 604. Because the first user 602 has demonstrated an affiliation with the enterprise, the internal index 328 may be accessed during the identification of the search results 608. Accordingly, the search results 608 may include a combination of results obtained from the internal index 328 and the public index 324. As discussed above, the internal index 328 may include complete access to the collected private enterprise data 106.

In some implementations, access to the search service provided by unified search service component 302 may be limited to users having an enterprise affiliation. However, in other implementations it may be desirable to enable members of the public to also access the search service. For example, members of the public may wish to learn more about particular enterprise products, services, careers, or the like. In such a case, however, the enterprise's private or sensitive information should not be made available to members of the public. Accordingly, when a second user 610 having no enterprise affiliation uses a second user device 612 to submit a search query 614 to the search service module 310, the search service module 310 may determine whether or not the second user has an authorized affiliation with the enterprise. Upon determining that the second user is not affiliated with the enterprise, the search service module 310 may provide search results 616 to the second user 610. The search results 616 may include a combination of results obtained from the public index 324 and the external index 330. As discussed above, the external index 330 is a redacted or censored index in that it does not contain information that is private, confidential, proprietary, or otherwise sensitive to the enterprise. Accordingly, the external index 330 contains information that is suitable for members of the public to access.

Additionally, in some implementations, there may be varying degrees of affiliation indexes 326. As one example, there may be a first internal index accessible by enterprise employees having a first level of clearance, a second internal index accessible by enterprise employees having a second level of clearance, a third internal index accessible by nonemployees having a third level of clearance, and the external index accessible by members of the public having no level of clearance. As another example, in some implementations, there may be no separate public index 324 generated from the public information 104. Instead, the public information may be included in the affiliation indexes 326. Further, the company may filter the information contained in the indexes or the search results to remove false, misleading or uncomplimentary items from the indexes or search results. Other variations will also be apparent to those of skill in the art in view of the disclosure herein.

Example Process for Providing Combined Search Results

Figure 7:
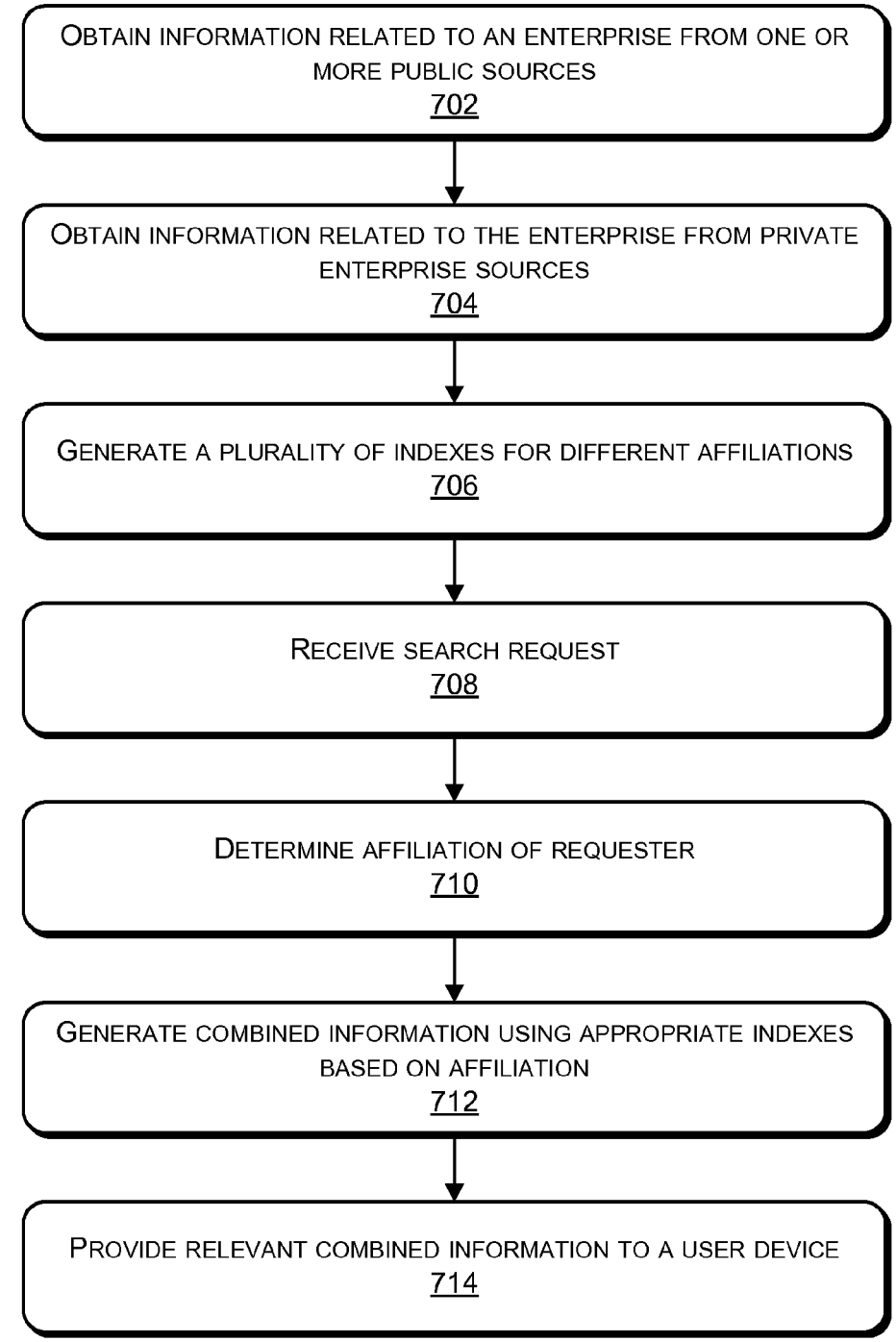
FIG. 7 is a flow diagram of an example process for generating combined information based on an affiliation of a user according to some implementations.

FIG. 7 is a flow diagram of an example process 700 for providing search results from public and private enterprise information according to some implementations herein. For discussion purposes, the process 600 is described with reference to the framework 300 of FIG. 3 and the framework 600 of FIG. 6, although other frameworks, devices, systems and environments may implement this process.

At block 702, the data collection module 304 obtains information related to an enterprise from one or more public online sources. For example, the data collection module 304 may obtain information related to the enterprise, enterprise projects, enterprise products, enterprise services, or the like, from one or more of social network feeds 112, micro-blog feeds 114, RSS feeds 116, and websites and other sources 118.

At block 704, the data collection module 304 obtains private information related to the enterprise from one or more enterprise sources, such as through a private enterprise intranet 120. For example, the data collection module 304 may use the enterprise intranet 120 to access one or more of an enterprise portal 122, an enterprise library 124, one or more enterprise databases 126, and/or other enterprise sources 128.

At block 706, the indexing module 308 generates a public index from the public data and one or more affiliation indexes from the private enterprise data. For example, as discussed above, the indexing module 308 may generate an internal index for use by users have an affiliation with the enterprise, and an external index for use by users not having an affiliation with the enterprise.

At block 708, the search service module 310 receives a search query from a user device. For example, the search query may include one or more keywords or phrases related to a subject for which the user desires information.

At block 710, the search service module 310 determines an affiliation of the user that submitted the search query. For example, the search service module may determine whether or not the user is an employee of the enterprise or otherwise authorized to access private or confidential information of the enterprise.

At block 712, the search service module 310 generates combined information, such as a search results page, in response to the search query and the determined affiliation of the user that submitted the search query. For example, if the user has demonstrated an affiliation with the enterprise, the search service module 310 may use the internal index and the public index to generate the search results page. On the other hand, if the search service module 310 determines that the user is not affiliated with the enterprise, the search service module may use the external index and the public index to generate the search results page.

At block 714, the search service module 310 provides the combined information in the search results page to the user in response to the search query. For example, the search results may include references to information obtained from both the public data 104 and the private enterprise data 106. Various other techniques for utilizing and disseminating the combined information are also contemplated herein, with the foregoing being just several examples.

Example Framework Implemented by Commercial Search Service

Figure 8:
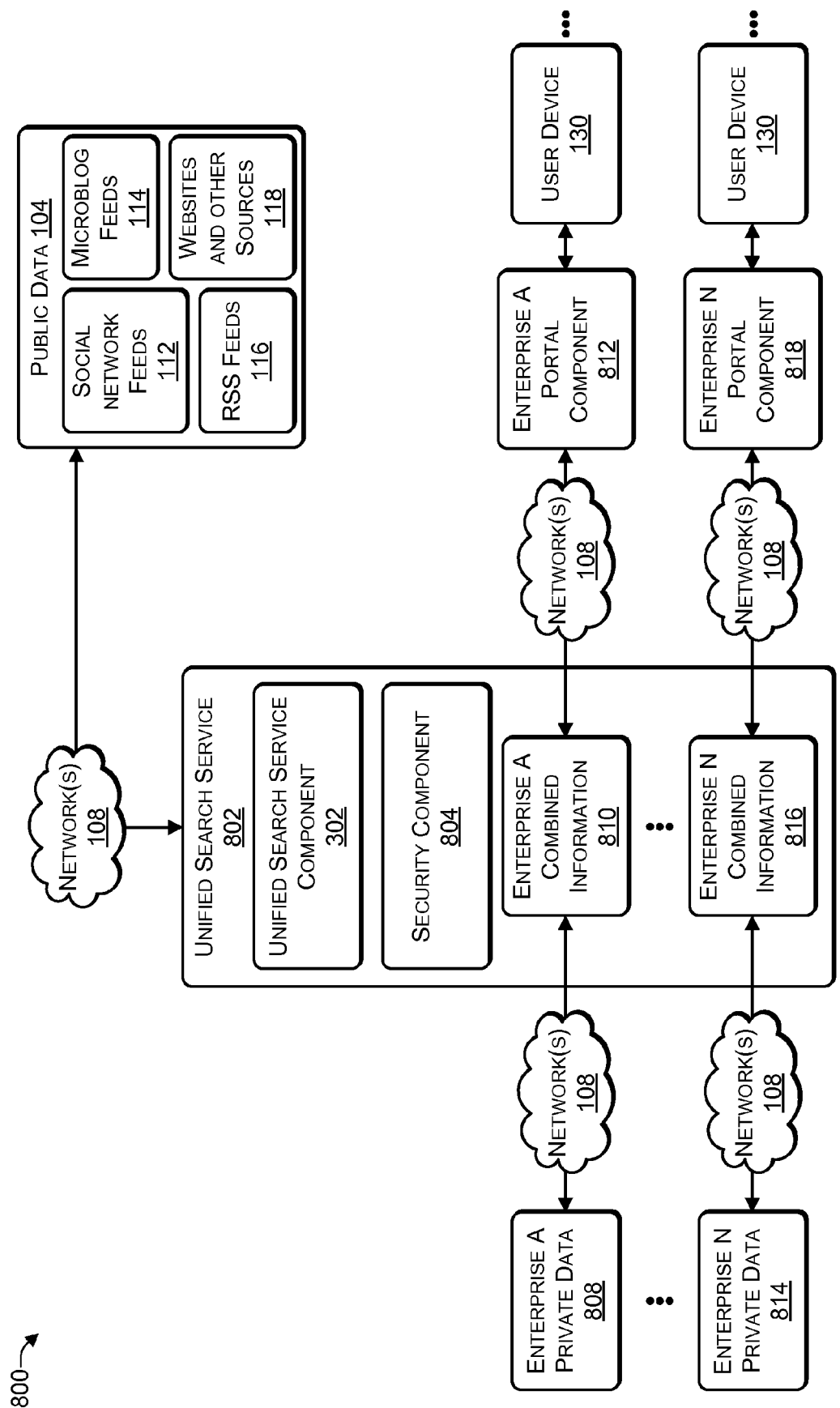
FIG. 8 is block diagram of an example framework for a unified search service implemented by an external entity according to some implementations.

FIG. 8 is a block diagram of an example framework 800 for a unified search service 802 that may be implemented by a third-party search service or other entity external to an enterprise. Unified search service 802 may include a unified search service component 302 similar to that described above with reference to FIG. 3. Unified search service 802 may further include a security component 804 for maintaining the security of the private data of one or more enterprises such as enterprise A, ..., enterprise N. For example, unified search service component 302 may be authorized to access enterprise A private data 808 to generate enterprise A combined information 810 in the manner described above. An enterprise A portal component 812 may be provided by the unified search service 802 or by enterprise A itself to enable a user device 130 to access the enterprise A combined information 810. For example, users affiliated with enterprise A may be provided combined information 810 based on the affiliation while users unaffiliated with enterprise A may be provided different combined information 810 based on their lack of affiliation with enterprise A. As mentioned above, enterprise A combined information 810 may include one or more of authored content, public and affiliation indexes, search results containing public and private enterprise A information, or the like.

Similarly, the unified search service component 302 may access enterprise N private data 814 to generate enterprise N combined information 816. An enterprise N portal component 818 may be provided by the unified search service 802 or by enterprise N to enable one or more user devices 130 to access the enterprise N combined information 816. The security component 804 may be configured to ensure that the enterprise A combined information 810, enterprise A private data 808, and other enterprise A information remain separate and inaccessible in relation to enterprise N combined information 816, enterprise N private data 814, and other enterprise N information, and vice versa. By offloading the unified search service component 302 to a third-party search service, an enterprise may obtain increased efficiency by having the unified search service managed by a commercial service. However some enterprises may not be willing or able to allow a third-party search service access to their intranet and private enterprise data.

Figure 9:
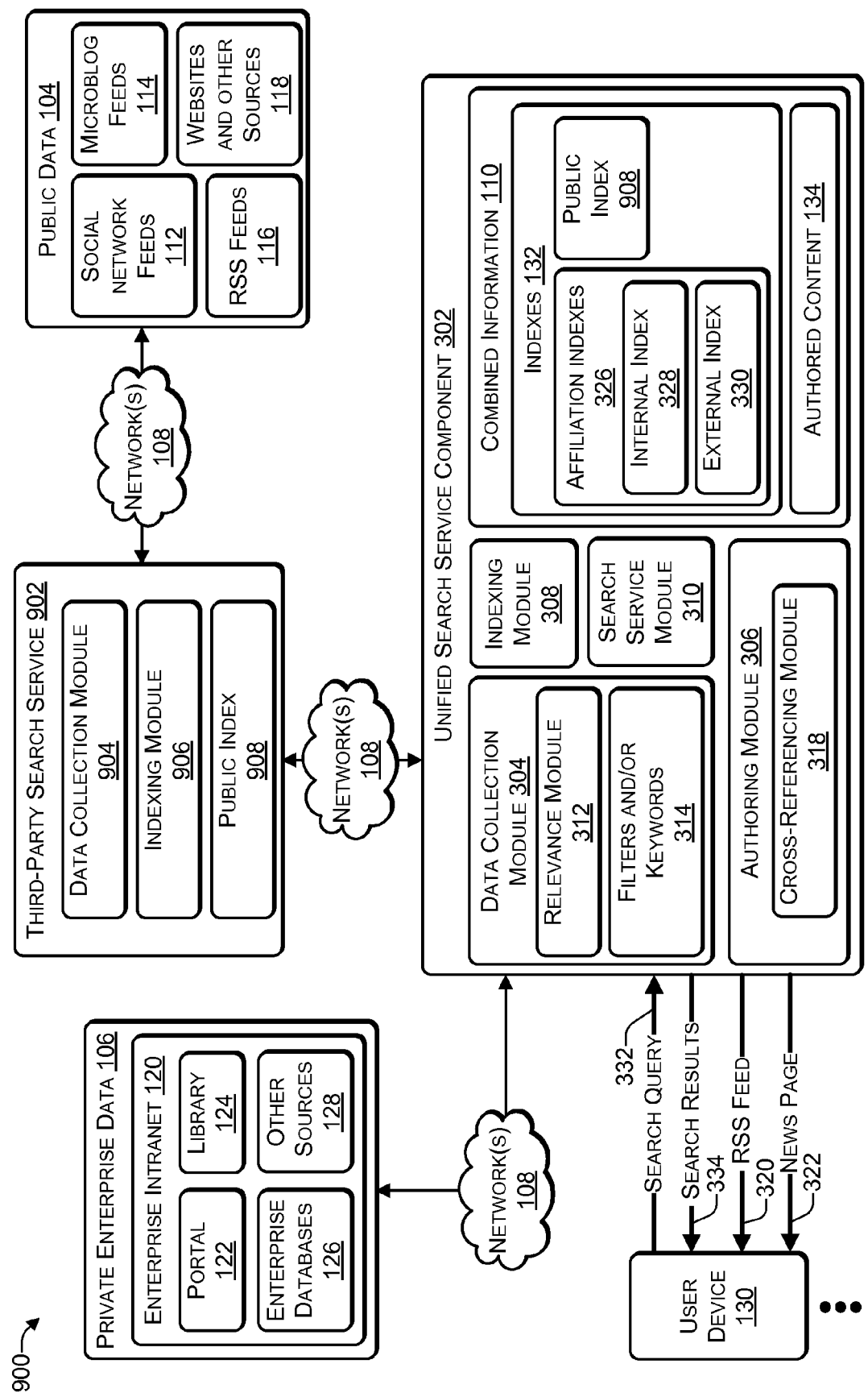
FIG. 9 is a block diagram of an example framework for a unified search service implemented in part by an enterprise and in part by a third-party search service according to some implementations

FIG. 9 is a block diagram of an example framework 900 for a unified search service that may be implemented in part by an enterprise and in part by a third-party search service. Framework 900 includes the unified search service component 302, which may be implemented by one or more computing devices of an enterprise, as described above with reference to FIG. 3. Framework 900 further includes a third-party search service 902 that implements a data collection module 904 and an indexing module 906. The data collection module 904 may replace the function of the data collection module 304 in collecting relevant public data 104. Accordingly, data collection module 304 operated by the enterprise merely collects private enterprise data 106 while the data collection module 904 implemented by the third-party search service 902 collects public data 104 relevant to the enterprise. The indexing module 906 provided by the third-party search service 902 indexes the collected public data 104 to generate a public index 908. The public index 908 is provided to the unified search service component 302 implemented by the enterprise. Accordingly, the unified search service component 302 of FIG. 9 is able to function in the same manner as that described above with reference to FIG. 3 for providing combined information 110. By offloading the searching of the public data 104 to a third-party search service, the enterprise is able to achieve efficiency as the amount of public data 104 to be searched will typically be substantially larger than the amount of private enterprise data 106 to be searched. Furthermore, in the implementation of FIG. 9, the enterprise is able to maintain the security of the private enterprise data 106 without allowing any outside access. Additionally, while several different example implementations have been described, those of skill in the art will recognize that numerous other variations are possible in view of the disclosure herein.

Example System Architecture

Figure 10:
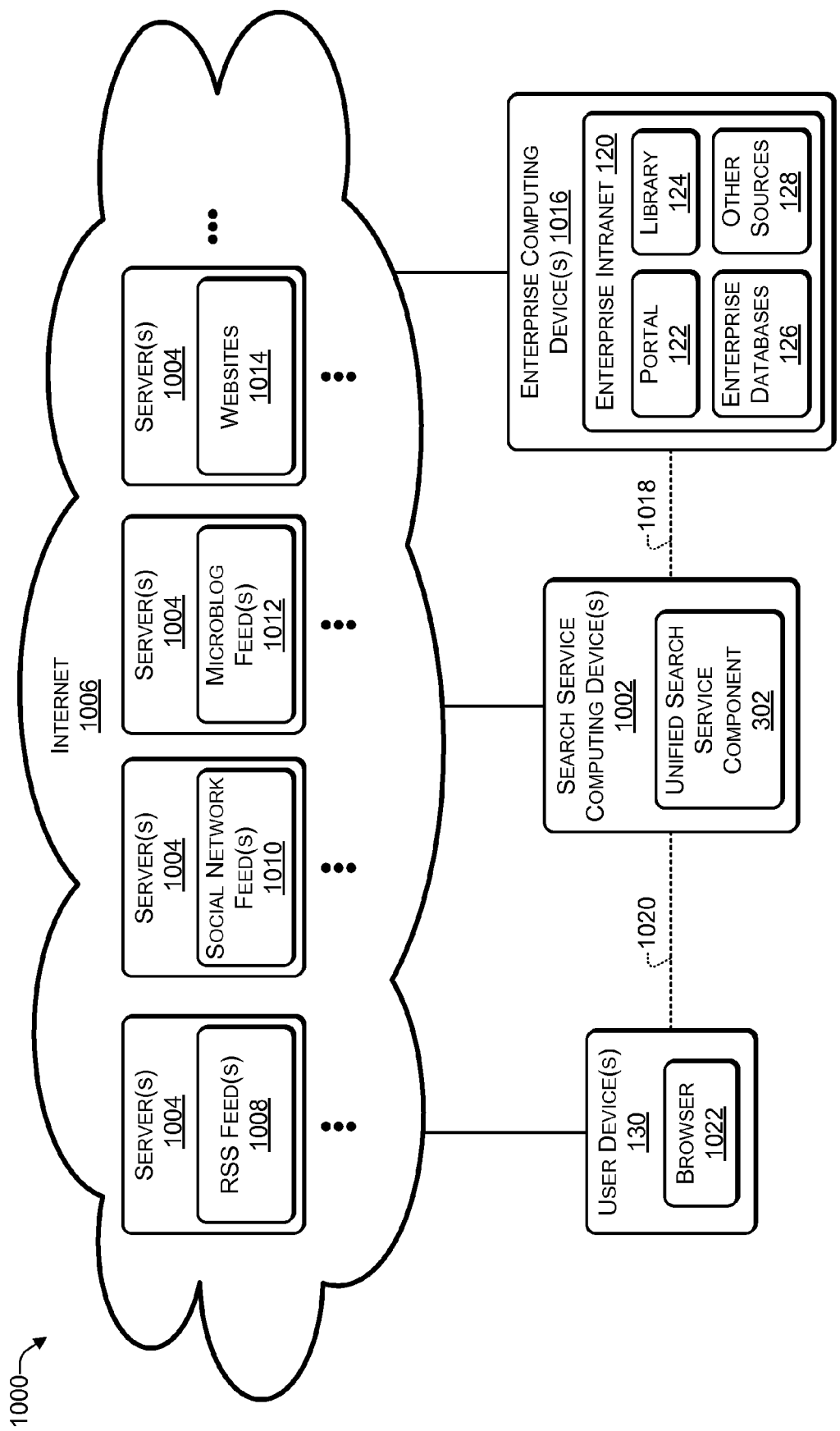
FIG. 10 is a block diagram of an example system architecture according to some implementations.

FIG. 10 is a block diagram of an example system architecture 1000 according to some implementations herein. In the illustrated example, system architecture 1000 includes at least one search service computing device 1002 able to communicate with a plurality of servers 1004 through the Internet 1006 and/or other suitable communication network. Each server 1004 may host or provide one or more of RSS feeds 1008, social network feeds 1010, microblog feeds 1012, websites 1014, and the like, to provide public data 104 as described above. For example, search service computing device(s) 1002 may be enterprise computing devices maintained by an enterprise, may be third-party search service computing devices maintained by a third-party search service, or a combination thereof, as described above for implementing the unified search service component 302. Further enterprise intranet 120, as described above, may be implemented by one or more enterprise computing devices 1016 for maintaining the private enterprise data 106, as described above. In the case in which search service computing device(s) 1002 are also enterprise computing devices, the search service computing device(s) 1002 may access the intranet 120 on enterprise computing devices 1016 through a direct connection or LAN 1018. Otherwise, in the case in which search service computing device(s) 1002 are provided by a third-party search service, the access to the enterprise intranet 120 may be through the Internet 1006.

As described above, one or more user devices 130 may access the unified search service component 302 to obtain combined public and private enterprise information. When the user computing devices 130 and the search service computing devices 1002 are both enterprise computing devices, the access may be through a LAN 1020. Alternatively, the access may be through the Internet 1006. In either case, the user may access the combined information provided by unified search service 302 using a browser 1022, or other suitable application, such as an RSS reader, or the like. For example, the browser 1022 may be used to access a news page or enterprise portal containing authored content, as described above. Further, while FIG. 10 illustrates one example of a suitable system architecture 1000, various other architectures, devices and environments may be used for the implementations herein, and the implementations are not limited to the specific arrangements in the figures.

Example Computing Device

Figure 11:
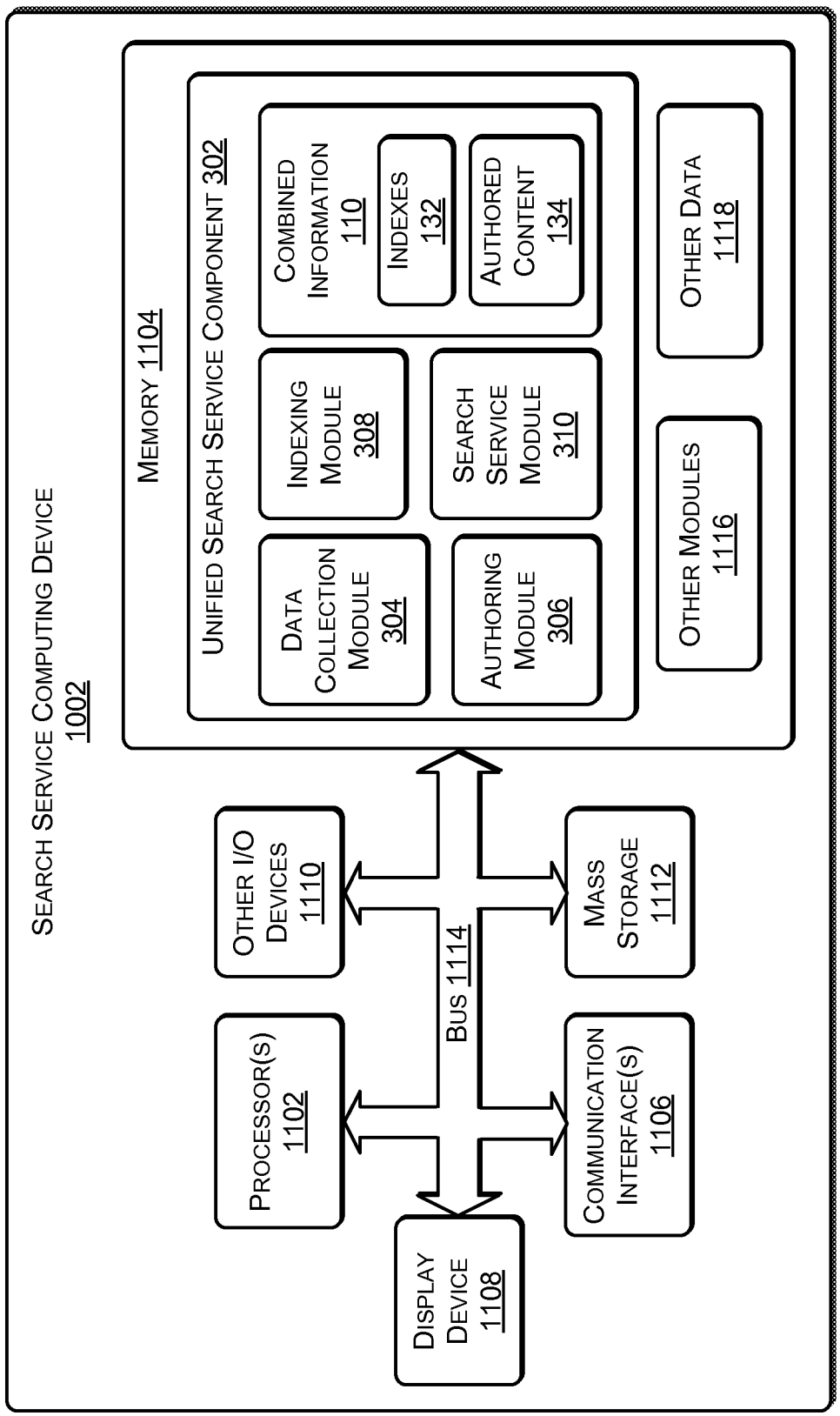
FIG. 11 is a block diagram of an example search service computing device according to some implementations.

FIG. 11 illustrates an example configuration of a search service computing device 1002 that can be used to implement the components and functions described herein. The computing device 1002 may include at least one processor 1102, a memory 1104, communication interfaces 1106, a display device 1108, other input/output (I/O) devices 1110, and one or more mass storage devices 1112, able to communicate with each other, such as via a system bus 1114 or other suitable connection.

The processor 1102 may be a single processing unit or a number of processing units, all of which may include single or multiple computing units or multiple cores. The processor 1102 can be implemented as one or more microprocessors, microcomputers, microcontrollers, digital signal processors, central processing units, state machines, logic circuitries, and/or any devices that manipulate signals based on operational instructions. Among other capabilities, the processor 1102 can be configured to fetch and execute computer-readable instructions or processor-accessible instructions stored in the memory 1104, mass storage devices 1112, or other computer-readable media.

The computing device 1002 can also include one or more communication interfaces 1106 for exchanging data with other devices, such as via a network, direct connection, or the like, as discussed above. The communication interfaces 1106 can facilitate communications within a wide variety of networks and protocol types, including wired networks (e.g., LAN, cable, etc.) and wireless networks (e.g., WLAN, cellular, satellite, etc.), the Internet and the like. Communication interfaces 1106 can also provide communication with external storage (not shown), such as in a storage array, network attached storage, storage area network, or the like.

A display device 1108, such as a monitor may be included in some implementations for displaying information to users. Other I/O devices 1110 may be devices that receive various inputs from a user and provide various outputs to the user, and can include a keyboard, a remote controller, a mouse, a printer, audio input/output devices, and so forth.

Memory 1104 and mass storage devices 1112 are examples of computer storage media for storing instructions that are executed on the processor 1102 to perform the various functions described above. For example, memory 1104 may generally include both volatile memory and non-volatile memory (e.g., RAM, ROM, or the like). Further, mass storage devices 1112 may generally include hard disk drives, solid-state drives, removable media, including external and removable drives, memory cards, Flash memory, floppy disks, optical disks (e.g., CD, DVD), a storage array, a network attached storage, a storage area network, or the like. Both memory 1104 and mass storage devices 1112 may be non-transitory computer storage media, and may collectively be referred to as memory or computer-readable media herein.

Memory 1104 and/or mass storage 112 are capable of storing computer-readable, processor-executable instructions as computer program code that can be executed by the processor 1102 as a particular machine configured for carrying out the operations and functions described in the implementations herein. For example, memory 1104 may include modules and components for a unified search service according to the implementations herein. In the illustrated example, memory 1104 includes the unified search service component 302, as described above, that affords functionality for providing unified search services for both public and private enterprise data. For example, as discussed above, unified search service component 302 may include the data collection module 304, the authoring module 306 and the indexing module 308. The unified search service component 302 may generate combined information 110 including indexes 132 and authored content 134. Memory 1104 may also include one or more other modules 1116, such as an operating system, drivers, communication software, or the like. Memory 1104 may also include other data 1118, such as data used by the other modules 1116.

Although illustrated in FIG. 11 as being stored in memory 1104 of computing device 1002, unified search service component 302, or portions thereof, may be implemented using any form of computer-readable media that is accessible by computing device 1002. Computer-readable media includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
under control of one or more processors configured with executable instructions,
obtaining first information related to an enterprise from one or more public online sources;
obtaining second information related to the enterprise from one or more private enterprise sources;
determining that the first information and the second information are non-duplicative of each other by comparing at least one of texts or images in the first information and the second information;
generating combined information by combining a portion of the first information related to a particular subject with a portion of the second information related to the particular subject;
determining a relevancy of the portion of the first information and the portion of the second information based on an identity of an author of the first information or the second information or source of the first information or the second information; and
based at least partly on generating the combined information, providing the combined information to one or more user devices.

2. The method as recited in claim 1, further comprising providing the combined information as a search result page to the one or more user devices based at least partly on a search query, received from a user device of the one or more user devices, wherein the search query is related to the particular subject.

3. The method as recited in claim 1, further comprising providing the combined information to a user device of the one or more user devices in a really simple syndication (RSS) feed related to the particular subject.

4. The method as recited in claim 1, wherein generating the combined information further comprises generating the combined information as a viewable page of content for presentation by a browser of a user device of the one or more user devices.

5. The method as recited in claim 1, wherein:
generating the combined information includes cross referencing the first information with the second information to identify items of information related to the particular subject; and
automatically or semi-automatically authoring authored content related to the particular subject, wherein the authored content includes the portion of the first information and the portion of the second information.

6. The method as recited in claim 5, wherein the authored content is automatically or semi-automatically authored based on one or more filters or keywords applied to the portion of the first information and the portion of the second information.

7. The method as recited in claim 1, wherein obtaining the first information includes obtaining the first information from at least one of:
publicly available social network feeds;
publicly available microblog feeds;
publicly available really simple syndication (RSS) feeds;
publicly available news sources; or
publicly available blog sources.

8. The method as recited in claim 1, further comprising:
obtaining at least one of the first information or the second information based on a source list that identifies sources for at least one of the first information or the second information; and
providing a user interface for enabling a plurality of users to add or delete sources from the source list, the source list including a history of changes to the source list made by the plurality of users.

9. The method as recited in claim 1, further comprising:
generating a plurality of searchable indexes from the second information, wherein a first index includes confidential enterprise information and a second index is free of the confidential enterprise information;
receiving a search query directed to the particular subject from a user device of a user;
determining an affiliation of the user with the enterprise;
based on whether the affiliation enables the user to access confidential enterprise information, selecting either the first index or the second index for responding to the search query;
generating the combined information, using either the first index or the second index selected for responding, by combining the portion of the first information with the portion of the second information; and
providing the combined information to the user device.

10. The method as recited in claim 9, further comprising ranking the portion of the first information and the portion of the second information based at least in part on determining the affiliation of the user.

11. A computing device comprising:
one or more processors in operable communication with computer-readable media;
at least one affiliation index maintained on the computer-readable media that includes information related to an enterprise obtained from one or more public online services and one or more private enterprise sources; and a unified search service component executed on the one or more processors to perform operations comprising:
receiving a search query from a user device;
based at least partly on receiving the search query, determining an affiliation of a user that is associated with the search query;
based at least partly on determining the affiliation of the user, using one or more information indices that correspond to the affiliation of the user to determine a portion of the information that is related to a particular subject, wherein the portion of the information includes first information obtained from the one or more public online services and second information obtained from the one or more private enterprise sources;
ranking the first information and the second information based at least in part on the affiliation of the user; and
providing the portion of the information to the user device.

12. The computing device as recited in claim 11, wherein determining the affiliation of the user further comprises determining whether the user is an employee of the enterprise.

13. The computing device as recited in claim 11, wherein the at least one affiliation index includes a plurality of information indices that are generated from the information, the plurality of information indices including a public index that provides access to public data, an enterprise-internal index that provides access to data that is kept confidential to the enterprise, and an enterprise-external index that provides access to publically unavailable data regarding the enterprise that is not kept confidential by the enterprise.

14. The computing device as recited in claim 13, wherein the operations further comprise applying the search query to the public index.

15. The computing device as recited in claim 11, wherein the operations further comprise filtering at least one of a topic, an image, a particular language, or false data from the information.

16. The computing device as recited in claim 11, wherein the ranking the first information and the second information based at least in part on the affiliation of the user comprises:
determining the user is affiliated with the enterprise based at least in part on the user's knowledge of enterprise private data;
determining a first relevance of the first information and a second relevance of the second information based at least in part on use of enterprise-specific lexicon of terms, taxonomy of technology, knowledge of enterprise product names, names of enterprise projects, or other private enterprise data; and
ranking the first information and the second information based at least in part on the first relevance and the second relevance.

17. One or more computer-readable memory having instructions stored thereon executable by a processor to perform operations comprising:
providing a user interface for displaying a list of one or more sources of information for generating at least one of an index or authored content, a source of information of the one or more sources of information representing a database that is accessible via a search query and comprises at least one of:
one or more private enterprise sources; or
one or more public sources;
providing an input area within the user interface for modifying the list by enabling addition of one or more sources of information to the list and deletion of one or more sources of information from the list;
collecting information from the one or more sources of information in the list; and
providing the collected information to one or more user devices via the user interface, wherein the providing the collected information comprises at least one of:
generating authored content based on the one or more sources of information in the list, the authored content being generated by combining a first item of information related to a particular subject from the collected information and a second item of information related to the particular subject from the collected information; or
generating one or more indexes based on the one or more sources of information in the list, the one or more indexes being generated from the collected information and being searchable for providing search results to the one or more user devices.

18. One or more computer-readable memory as recited in claim 17, wherein the operations further comprise providing, in the user interface, a history of the list accessible from the one or more user devices, the history showing changes to the list made from the one or more user devices, the changes including at least one of:
sources of information added to the list from the one or more user devices; or
sources of information deleted from the list from the one or more user devices.

19. One or more computer-readable memory as recited in claim 17, wherein generating the authored content further comprises cross-referencing the first item of information and the second item of information to determine that the first item of information and the second item of information are directed to a same subject and are not duplicates of each other or other previously posted items of information.

* * * * *